Dec. 11, 1923.  1,476,797

J. P. CARLIN

HINGE FOR COOKING UTENSILS

Filed Feb. 15, 1922

Inventor

John P. Carlin

By T. Clay Lindsey.

His Attorney

Patented Dec. 11, 1923.

1,476,797

UNITED STATES PATENT OFFICE.

JOHN P. CARLIN, OF CROMWELL, CONNECTICUT.

HINGE FOR COOKING UTENSILS.

Application filed February 15, 1922. Serial No. 536,805.

*To all whom it may concern:*

Be it known that I, JOHN P. CARLIN, a citizen of the United States, and a resident of Cromwell, county of Middlesex, State of Connecticut, have invented certain new and useful Improvements in a Hinge for Cooking Utensils, of which the following is a specification.

This invention relates generally to cooking utensils, and has more particular reference to hinges for lids or tops of pots or kettles. The aim of the invention is to provide an improved device of this character which is simple and economical in construction, and which may be readily attached to the lid of a kettle or the like. The device finds peculiar application as a substitute hinge part when the usual hinge leaf of a pot or kettle is broken off of the lid, as so often happens.

In the accompanying drawing, wherein I have shown one embodiment which the invention may take, Fig. 1 is a side elevational view of my device applied to a pot, the latter being shown in dotted lines;

Figure 1:
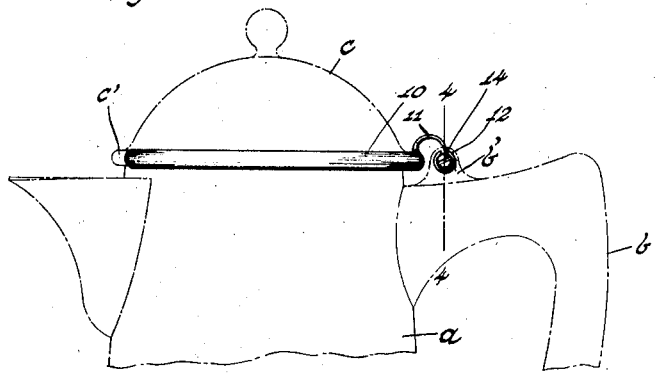
Figure 2:
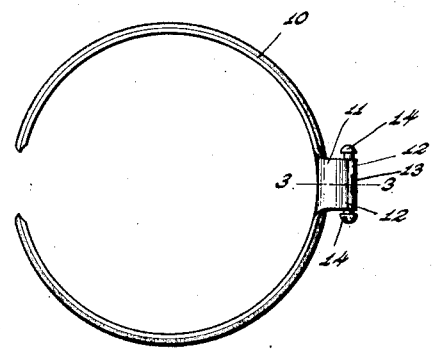
Fig. 2 is a top view of the hinge member.
Figure 3:
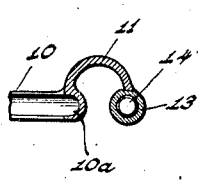
Fig. 3 is a sectional view taken on line 3—3 of Fig. 2.

Referring to the drawings in detail, *a* denotes the body portion of a coffee pot, *b* the handle, and *c* the lid or cover. In the present instance formed integral with the handle *b* is a pair of apertured ears *b'* which constitute the knuckles of one leaf of the hinge. Usually there is permanently secured to the lid a leaf which is pivotally connected to the ears *b'* in any suitable manner. Not infrequently this leaf is broken off of the lid, and this is particularly true where the joint between the leaf and the lid is weakened owing to the high heat to which the lid is subjected during the enamelling operation.

Figure 4:
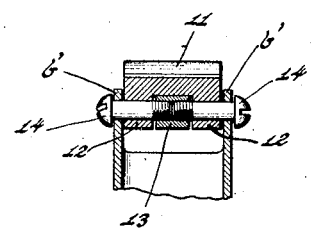
Fig. 4 is a sectional view taken on the line 4—4 of Fig. 1.

The device of the present invention comprises a hinge member adapted to be detachably connected to the lid and having a leaf or knuckle arranged for pivotal connection with the usual ears *b'* of the pot. In the present illustrated disclosure, this device includes a split ring 10 having an internal groove 10ª adapted to receive the bead or rolled edge *c'* of the lid. The ring 10 is made of suitable resilient material so that it may be sprung into place. Integral with the ring 10 is a leaf 11 preferably curved as shown, and having a pair of spaced knuckles 12 adapted to fit (as most clearly shown in Fig. 4) between the ears *b'*. Fitting between the knuckles is an internally threaded bushing 13 which receives the ends of the pintle screws 14.

With the arrangement described, it will be seen that in event the usual leaf of the lid becomes detached the device of the present invention may be substituted in its place, and this substitution is very easily brought about, it being merely necessary to spring the ring 10 around the bead *c'* and then fasten the ring to the ears *b'* as described. It will be seen that the structure is very simple and the ring is connected to the ears *b'* in a very effective and economical manner. The bushings 13 may be very cheaply made and these bushings securely hold the pintle screws 14 against displacement.

Of course, it is understood that my device is susceptible of various modifications and changes which will be within the spirit of my invention without departing from the scope of the following claims; and while I have described the device as serving the purpose of a substitute hinge, it is evident that a cooking utensil as originally placed upon the market may be provided with the device of the present invention.

I claim as my invention:—

1. A device of the character described comprising a member adapted to be detachably connected to the lid of a utensil and having an integral leaf provided with a pair of knuckles; an internally threaded bushing positioned between said knuckles, and a pintle screw in each knuckle, said screws having their ends threaded into said bushing.

2. In a device of the character described, a split ring-shaped member having an internal groove adapted to receive a bead of a utensil lid, said member having an integral leaf provided with a pair of knuckles adapted to be positioned between a pair of ears on the body portion of the utensil; an internally threaded bushing positioned between said knuckles, and pintle screws for connecting said knuckles to the ears and having their inner ends threaded into said bushing.

JOHN P. CARLIN.